United States Patent
McCarter et al.

(10) Patent No.: US 7,264,387 B1
(45) Date of Patent: Sep. 4, 2007

(54) REDUCED DEPTH PROJECTOR HEADLAMP ASSEMBLY

(75) Inventors: Glenn McCarter, Ann Arbor, MI (US); Arun Kumar, Farmington Hills, MI (US); Todd D. Irgang, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/430,019

(22) Filed: May 8, 2006

(51) Int. Cl.
*F21W 101/08* (2006.01)

(52) U.S. Cl. ...................... 362/538; 362/527; 362/514; 362/507

(58) Field of Classification Search ................. 362/527, 362/538, 514, 507
See application file for complete search history.

(56) References Cited

U.S. PATENT DOCUMENTS

| | | | |
|---|---|---|---|
| 1,775,619 A | | 9/1930 | Whalen |
| 3,532,870 A | * | 10/1970 | Brueder ...................... 362/523 |
| 4,480,291 A | | 10/1984 | Dranginis |
| 4,811,174 A | | 3/1989 | Kanzler et al. |
| 5,414,601 A | * | 5/1995 | Davenport et al. ......... 362/538 |
| 6,186,650 B1 | | 2/2001 | Hulse et al. |
| 6,814,480 B2 | | 11/2004 | Amano |
| 6,882,110 B2 | | 4/2005 | Ishida et al. |
| 6,891,333 B2 | | 5/2005 | Tatsukawa et al. |
| 6,948,836 B2 | | 9/2005 | Ishida et al. |
| 6,951,416 B2 | | 10/2005 | Sazuka et al. |
| 2003/0214815 A1 | | 11/2003 | Ishida et al. |
| 2004/0008516 A1 | | 1/2004 | Amano |
| 2004/0160783 A1 | | 8/2004 | Tatsukawa et al. |
| 2004/0174712 A1 | | 9/2004 | Yagi |
| 2004/0184280 A1 | | 9/2004 | Ishida et al. |
| 2004/0202007 A1 | | 10/2004 | Yagi et al. |
| 2005/0180158 A1 | | 8/2005 | Komatsu |
| 2007/0019432 A1 | * | 1/2007 | Shimada ..................... 362/545 |

FOREIGN PATENT DOCUMENTS

JP    2005-214705    *   1/2006

* cited by examiner

*Primary Examiner*—Laura Tso
(74) *Attorney, Agent, or Firm*—Brinks Hofer Gilson & Lione

(57) ABSTRACT

A reduced depth headlamp assembly for use in a motor vehicle. The housing includes an exterior lens, and a mirror, and defines a housing axis extending between the exterior lens and the mirror. The projector includes a light source, a reflector, and a condenser lens co-axially arranged along a projector axis defined between the light source and the condenser lens. The projector is mounted to the housing such that the projector axis and the housing axis form an angle, preferably a ninety (90) degree angle, thereby minimizing the depth of the assembly.

15 Claims, 7 Drawing Sheets

REDUCED DEPTH PROJECTOR HEADLAMP ASSEMBLY

BACKGROUND

1. Field of the Invention

The present invention generally relates to automotive headlamp assemblies. More specifically, the invention relates to a halogen or HID projector headlamp assembly having a reduced packaging depth.

2. Description of Related Art

Typically, two automotive headlamp assemblies are positioned on the front of a motor vehicle. These assemblies often house multiple features including low beam, high beam, park lamp, turn indicator, front side reflectors and front side markers. All of these functions must be contained within a package volume that often has available significantly greater width and height than depth. The limited depth results from design constraints that often position other components, such as the battery, engine, radiator and wheels, as far toward the front end of the vehicle as possible. Therefore, while there may be significant unused space horizontally (cross-car) and vertically, these other components limit the amount of depth available.

This is particularly problematic with existing projector headlamp assemblies using halogen or HID lamp projectors for the low and high beam functions. Compared to reflector headlamp assemblies, projector headlamps reduce the width and height necessary for the low and high beam functions, but are heavier and significantly longer. However, as noted above, motor vehicles often have limited depth available for headlamps, making the increased length of projector headlamps a significant disadvantage.

In addition projectors are also problematic for vehicles using concealed headlamps. A concealed headlamp usually hides the headlamp assembly beneath a headlamp door. When the headlamps are not in use, the headlamp door is closed, concealing the headlamps from view. Upon activation of the headlamps, the headlamp door opens and rotates the headlamp assembly into its operating position.

While this is a practical arrangement for older, reflector style headlamps, it is less practical for projector style headlamps. The additional length of projectors requires longer headlamp doors, limiting styling options. In addition, the additional weight of the projectors requires more robust headlamp doors and/or actuators to rotate the projectors between the open and closed positions.

In view of the above, it is apparent that there exists a need for an improved projector headlamp assembly providing reduced depth and a better configuration for concealed headlamps.

SUMMARY

In satisfying the above need, as well as overcoming the enumerated drawbacks and other limitations of the related art, the present invention provides a reduced depth automotive headlamp assembly for use in a motor vehicle to illuminate, for example, a road. The headlamp assembly primarily comprises a housing and a projector lamp, with the housing including an exterior lens, a mirror, and a housing axis defined between the exterior lens and the angled mirror, and the projector lamp including a light source, a reflector, and a condenser lens co-axially aligned along a projector axis defined between the light source and the condenser lens. The depth of the headlamp assembly is reduced by mounting the projector lamp to the housing such that the projector axis and the housing axis form a projector angle. Any angle may be used, but a 90 degree angle will minimize the depth of the assembly. Relative to the vehicle, the projector may be oriented horizontally, vertically or anywhere in between, depending on the needs of a particular application. In operation, light emitted from the light source is focused by the condenser lens onto the mirror which is oriented at one-half the projector angle, and is redirected through the exterior lens and onto the road.

In another embodiment, the projector lamp may be pivotably coupled to the housing such that the housing is concealed from view when the headlamp assembly is "off," and the housing rotates into view when the headlamp assembly is "on." In this embodiment, the housing and mirror only come into proper alignment with the projector lamp after rotating into the "on" position.

In a third embodiment, the entire headlamp assembly described above may be pivotably mounted within the vehicle. In this embodiment, the housing is concealed from view when the headlamp assembly is "off," and the entire assembly pivots together, bringing the housing into view when the headlamp assembly is "on."

Further objects, features and advantages of this invention will become readily apparent to persons skilled in the art after a review of the following description, with reference to the drawings and claims that are appended to and form a part of this specification.

DETAILED DESCRIPTION

Figure 1:
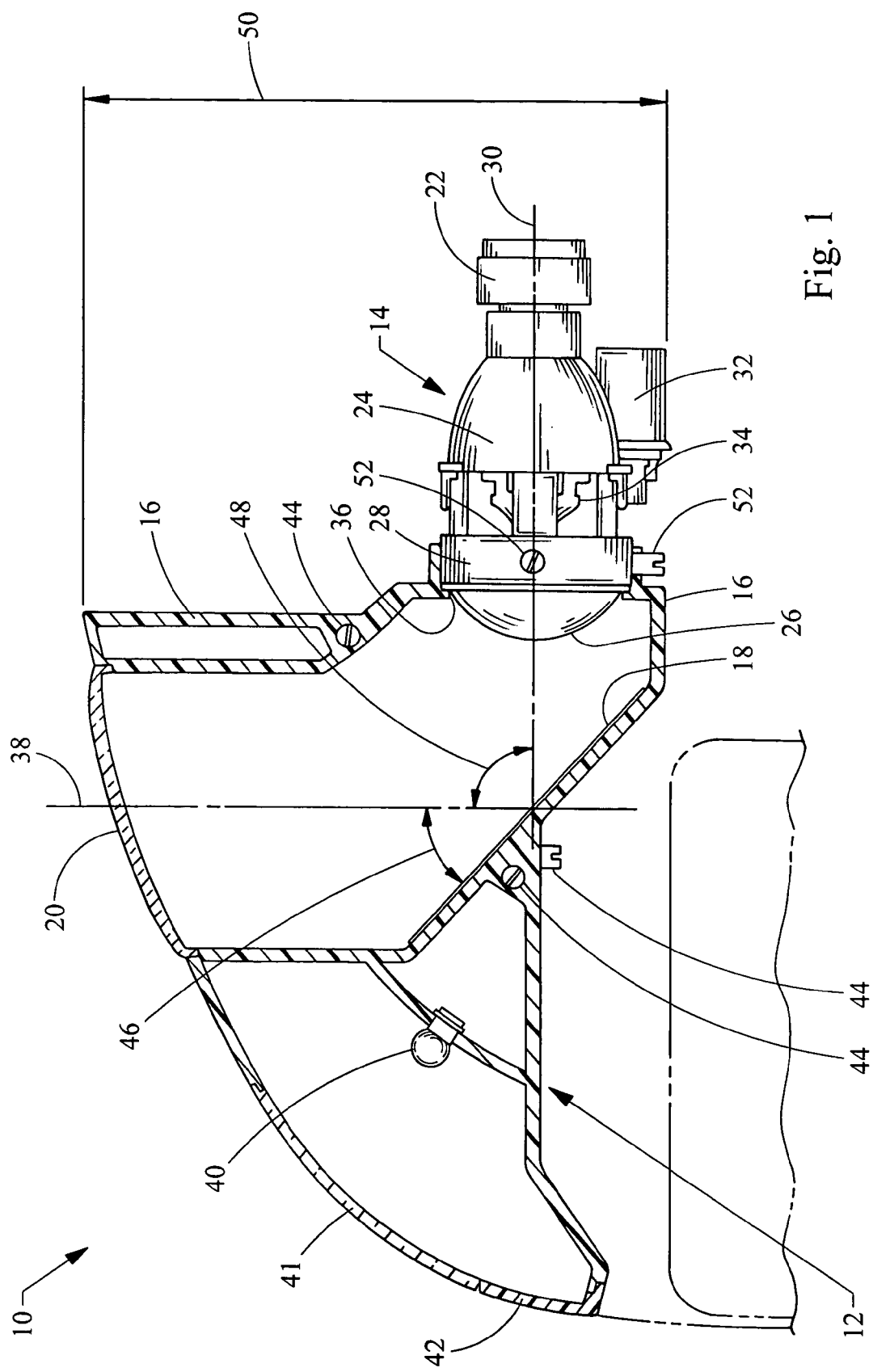
FIG. 1 is a top view of a reduced depth projector headlamp assembly embodying the principles of the present invention.
Figure 2:
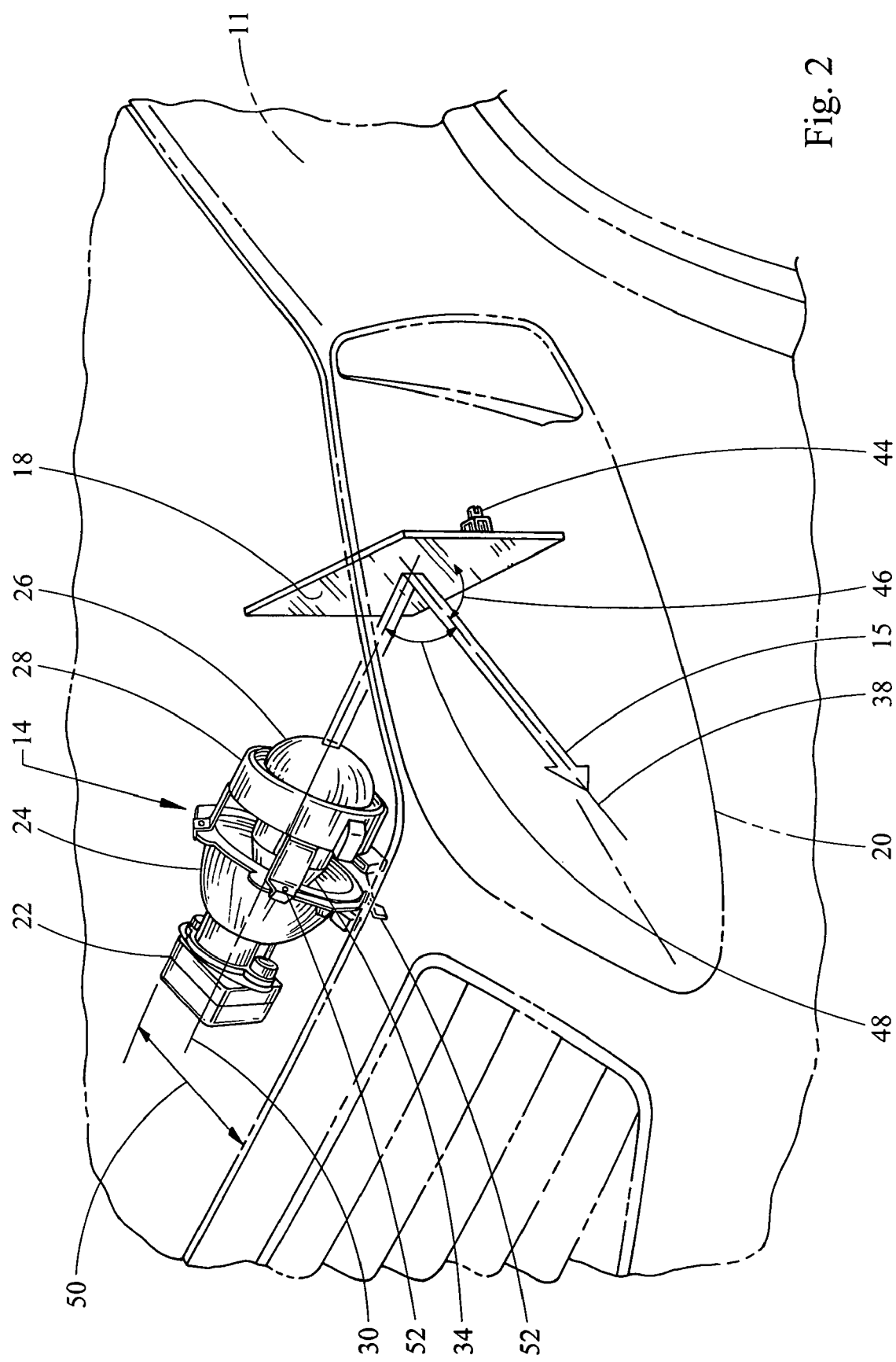
FIG. 2 is a left-front perspective view of a motor vehicle showing several components of the headlamp assembly of FIG. 1.

Referring now to FIG. 1, a headlamp assembly embodying the principles of the present invention is illustrated therein and designated at 10. As its primary components, the headlamp assembly 10 includes a housing 12, a projector 14, and a mirror 18. The projector 14 is coupled to the housing 12 and the mirror is arranged to reflect light emitted from the projector 14 through a cover lens 20. FIG. 2 shows the headlamp assembly 10, with the housing 12 omitted for clarity, arranged within a motor vehicle 11. An arrow 15 illustrates the path of the light emitted from the projector 14.

Returning to FIG. 1, the projector 14, as mentioned above, is the light source for the headlamp assembly 10. It is composed of a bulb assembly 22 mounted to a reflector 24 that directs light emitted from the bulb assembly 22 through a condenser lens 26 supported by a lens retainer 28 coupled to the reflector 24. The bulb assembly 22, reflector 24, lens 26 and retainer 28 are co-axially aligned along a projector axis 30 and light emitted by the bulb assembly 22, is focused by the condenser lens 26 along the projector axis 30. The bulb assembly 22 includes any conventional light source, for example a halogen bulb, a high intensity discharge (HID) bulb or other light source. Some embodiments also include a solenoid 32 and a shield 34, the solenoid 32 moving the shield 34 to alter the intensity of the light emitted by the projector 14 (i.e. to switch between low and high beam operational modes).

The housing 12 includes a frame 16 supporting the cover lens 20, and the mirror 18. The mirror 18 is arranged within the frame 16 such that any light directed through an opening 36 and upon the mirror 18 will be reflected through the cover lens 20 along a housing axis 38. Additional exemplary features of the housing 12 may include turn light signals 40, and lenses 41, as well as reflectors 42.

Figure 3:
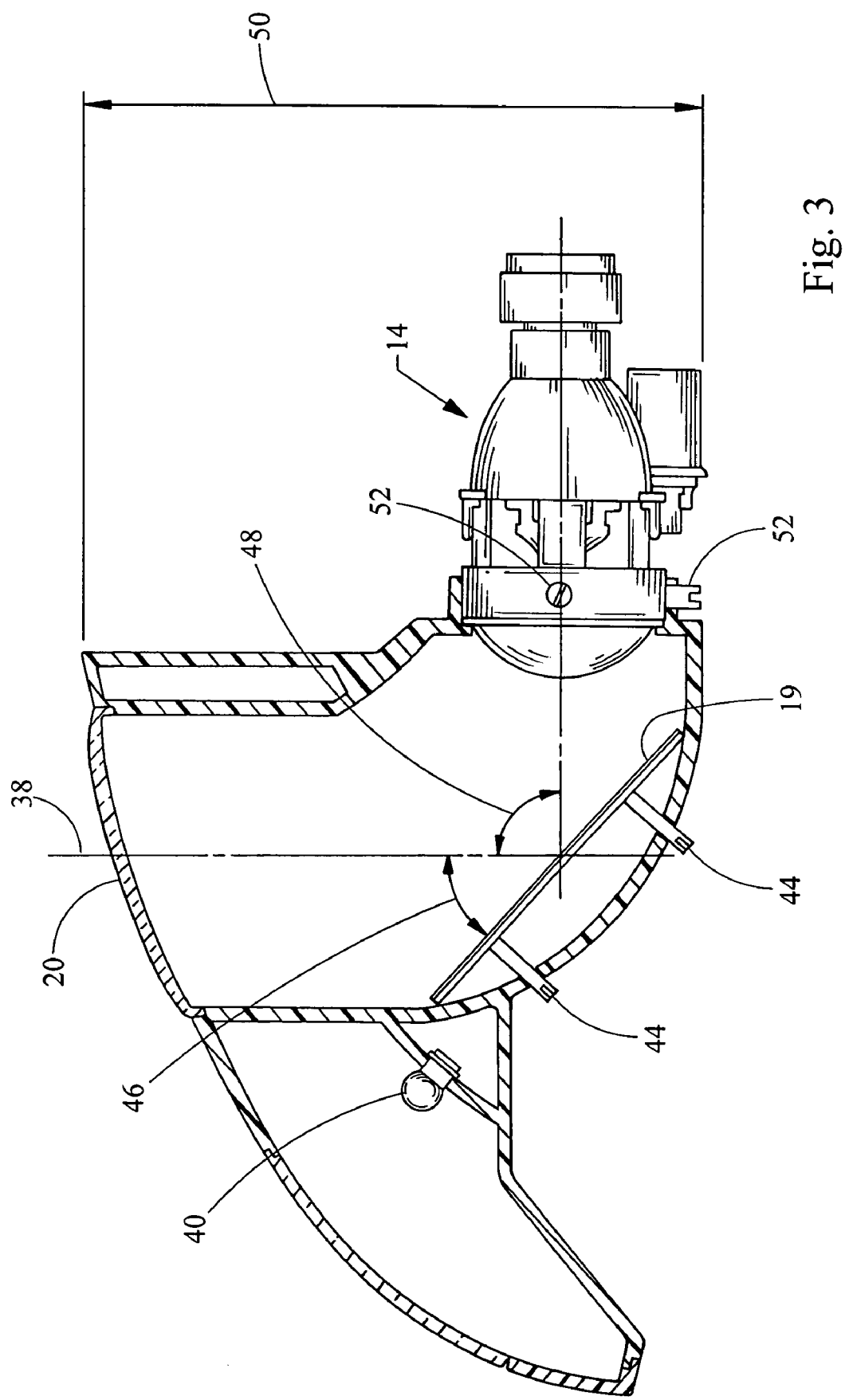
FIG. 3 is a top view of a headlamp assembly according to FIG. 1 having an alternate mirror configuration.

The mirror 18 may be any kind of appropriate reflective material, such as for example, polished metal, mylar, or silvered glass. While the mirror 18 shown in the embodiments of FIGS. 1-7 is a single component, it is also possible to have multiple mirror segments (not shown) forming the mirror 18. Furthermore, the mirror 18 may be formed as either an integral part of the housing 12, such as a polished surface of the frame 16 itself or adhered to a surface of the frame 16 (as shown in FIG. 1), or as a separate mirror 19 (as shown in FIG. 3) supported with respect to the housing 12. In addition, mirror adjustment screws 44, configured to adjust the orientation of the mirror 18 from outside of the housing 12, may also be provided. When used with a separate mirror 19, the mirror adjustment screws 44 may increase the amount of adjustment available, but this is a more costly and mechanically complex arrangement than the integral mirror 18 shown in FIG. 1. In each of these embodiments, the mirror 18 or 19 is oriented at a mirror angle 46 with respect to the housing axis 38.

The projector 14 as shown in FIG. 1 is installed within the opening 36 such that the projector axis 30 is oriented at a projector angle 48 with respect to the housing axis 38. The projector 14 may be coupled to the bezel 36 using any conventional fastening means. For example, the projector 14 may be adhered within the opening 36, threaded into the opening 36, attached by screws to the opening 36 or otherwise secured using any appropriate fastener or fastening means. Projector adjustment screws 52, configured to adjust the orientation of the projector 14, may also be included to help ensure this relationship.

To properly direct the light from the projector 14 through the cover lens 20 requires the mirror angle 46 to be one-half of the projector angle 48. For example, the embodiment of FIG. 1 shows a ninety (90) degree projector angle 48 and a forty-five (45) degree mirror angle 46. This results in a minimum overall depth 50 of the headlamp assembly 10. Other embodiments may use different projector angles 48 to meet the design and styling requirements of a particular application, so long as the above relationship with the mirror angle 46 is maintained.

Figure 4:
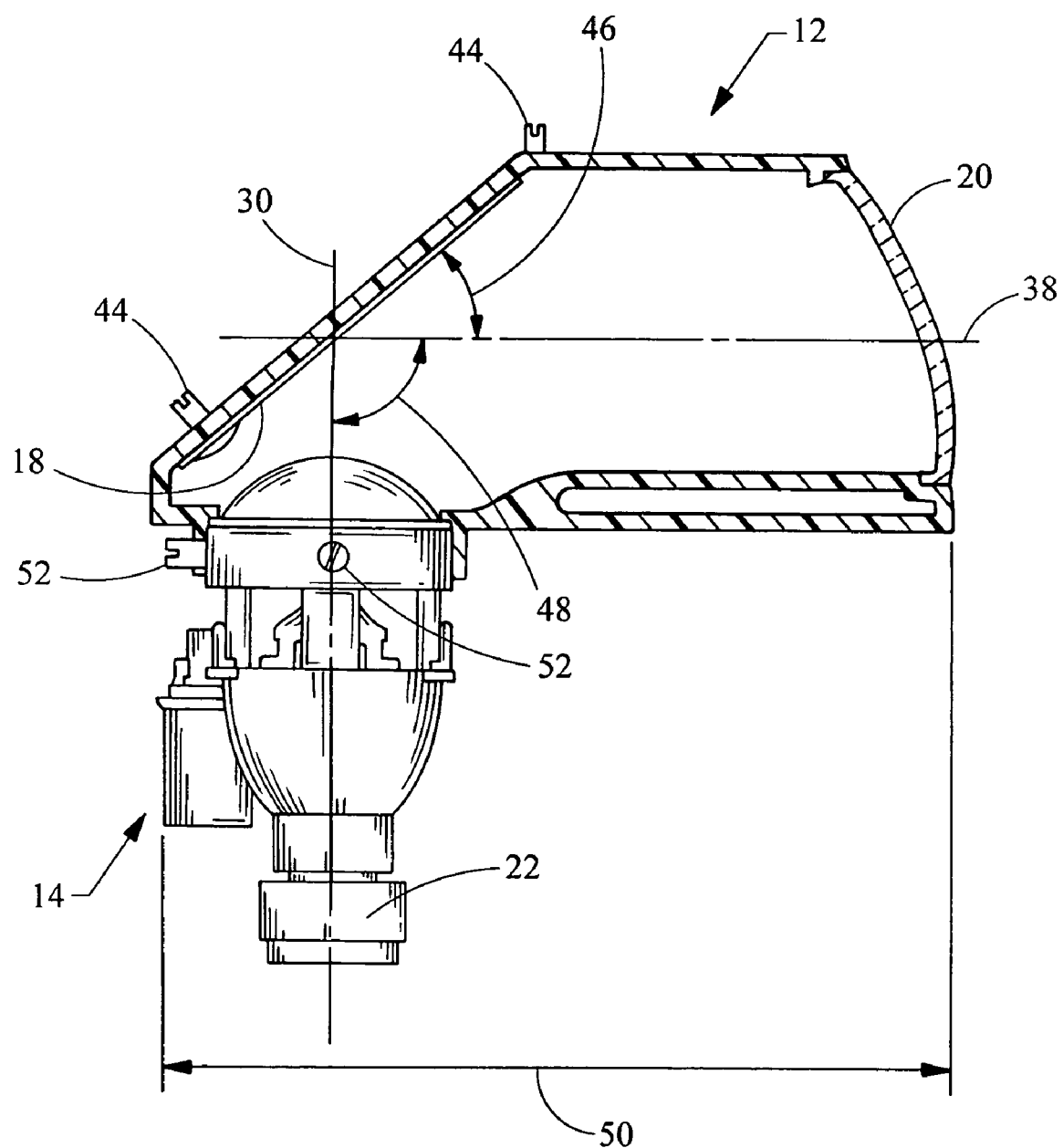
FIG. 4 is a side view of a headlamp assembly including a vertically oriented projector.

Other orientations of the projector 14 that reduce the overall depth 50 of the headlamp assembly 10 are also possible. For example, while FIGS. 1 and 3 show the projector 14 aligned horizontally within the motor vehicle 11 (see FIG. 2), the projector 14 may instead be aligned as seen in FIG. 4, where the lens 20 is oriented toward the front of the motor vehicle (not shown) and the bulb assembly 66 is oriented down. In this embodiment, the projector 14 is rotated about the housing axis 35, in this example, by ninety (90) degrees with respect to the housing 12, into a vertical orientation (i.e., up and down) with respect to the motor vehicle 11 (not shown). By way of contrast, the projector 14 of the embodiment shown in FIG. 2 runs horizontally (cross-car) with respect to the motor vehicle 11. It is important to note other rotations of the projector axis 30 about the housing axis 38 are possible so long as the above relationship between the mirror angle 46 and the projector angle 48 is maintained.

In another embodiment, the headlamp assembly is concealed. In such a configuration, the headlamp assembly 10 is hidden from view beneath a headlamp door 56 when the headlamp assembly 10 is not in use (see FIG. 5). When the headlamp is activated, the headlamp door 54 opens and a pivotable housing 58 rotates into an operating position (see FIG. 6). The headlamp configuration shown in FIGS. 7 and 8 is an example of a pop-up headlamp 54.

Figure 5:
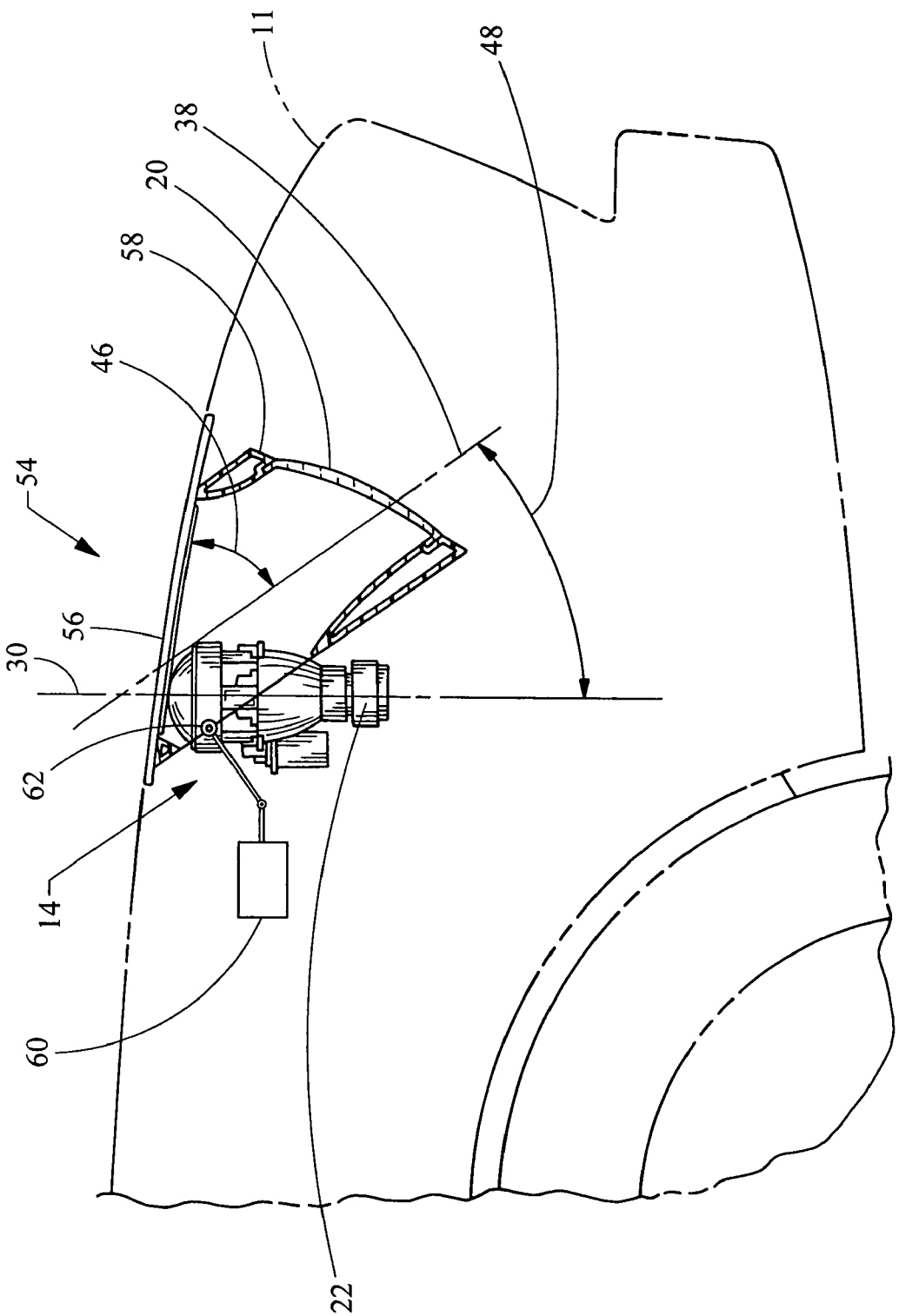
FIG. 5 is a side view of a headlamp assembly used in a pop-up headlamp configuration showing the housing in a closed position.

Looking more closely at FIG. 5, in which like numerals denote similar components with the headlamp assembly 10, the pop-up headlamp 54 is shown coupled to the headlamp door 56 in the "off" or closed position. When "off," the headlamp 54 is concealed within the body of the motor vehicle 11. A pivotable housing 58 is pivotably mounted at a pivot 62 to the vehicle 11 or to the projector 14 itself. The projector 14 is oriented vertically and mounted to the motor vehicle 11. When the housing 58 is in the "off" position, the projector axis 30 and the housing axis 38 do not align as required above.

Figure 6:
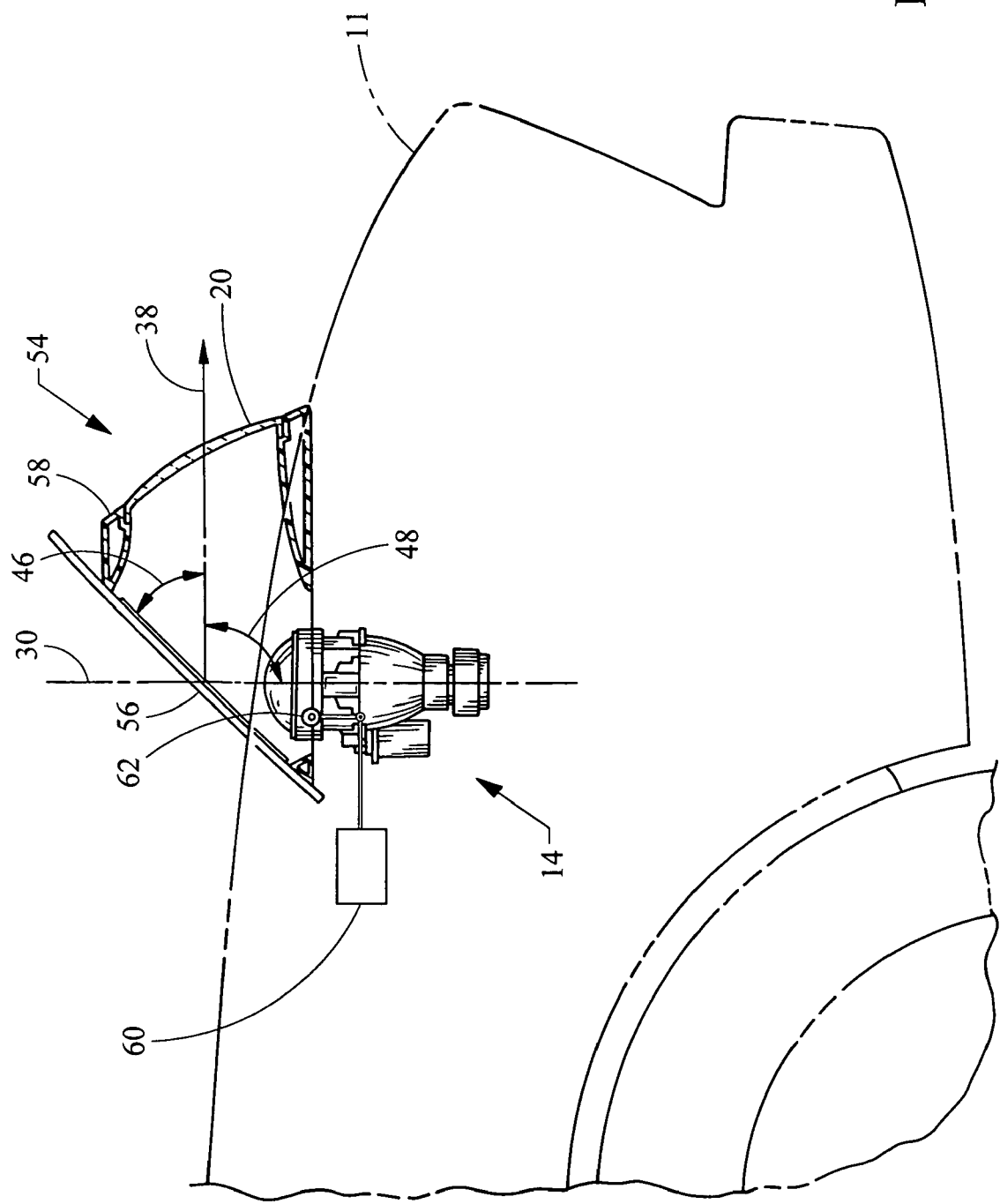
FIG. 6 is a side view of the headlamp assembly of FIG. 5 showing the headlamp in an open position.

In the "on" or open position of FIG. 6, when the headlamp 54 is turned on, the headlamp door 54 and housing 58 rotates by means of an actuator 60 and "pops-up" into the operating position. Only when the housing 58 is in the "on" position does the projector axis 30 and the housing axis 38 align such that the mirror angle 46 is one-half of the projector angle 48.

Figure 7:
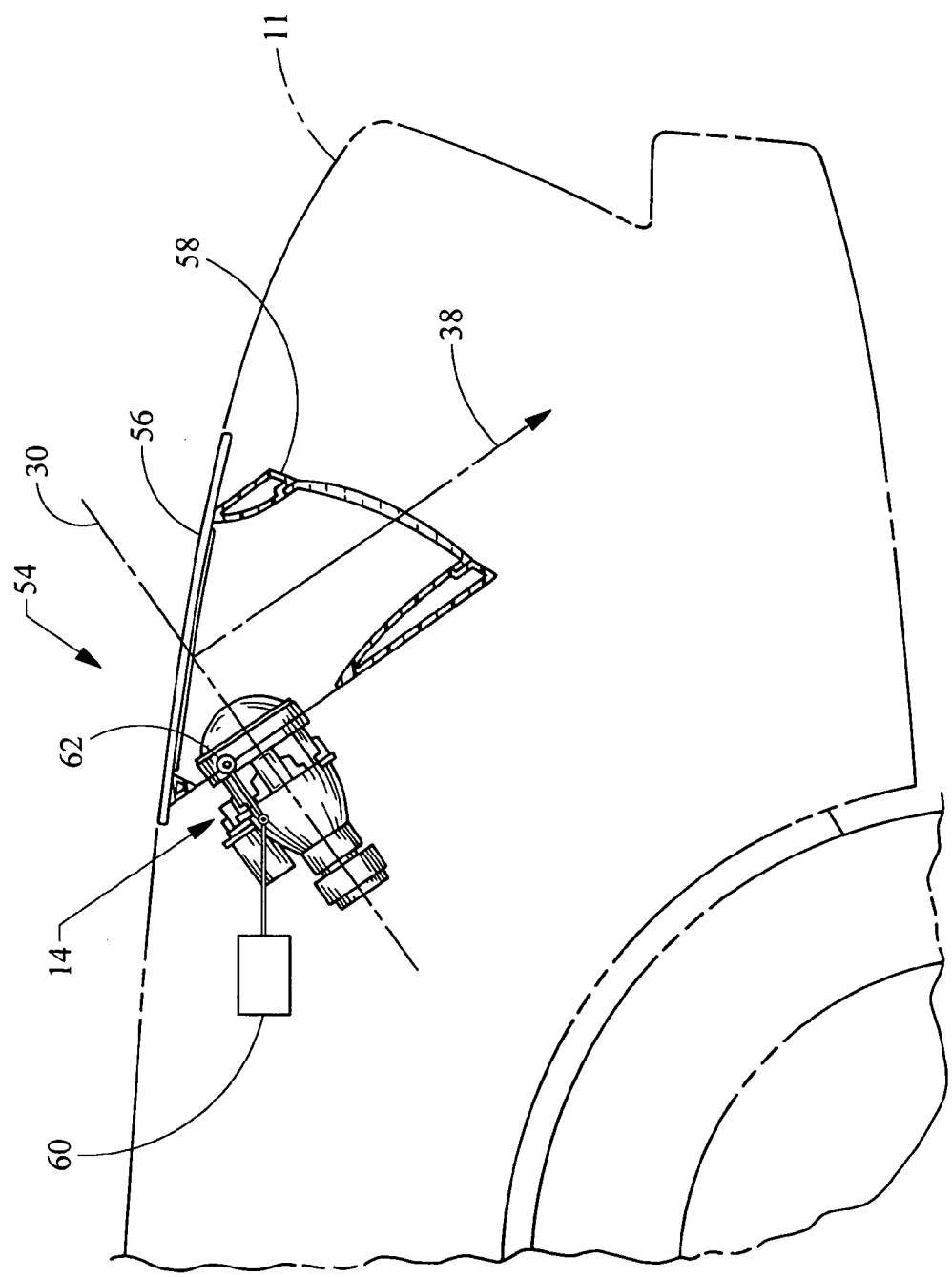
FIG. 7 is a side view of an alternate configuration of the headlamp assembly of FIG. 5 wherein the projector and housing pivot together.

An alternate embodiment of the pop-up headlamp 54 is shown in FIG. 7. In this embodiment, the projector 14 is coupled to the pivotable housing 58, rather than the motor vehicle 11, in a similar fashion to the configuration of FIG. 4. As a result, only the pivotable housing 58 is pivotably mounted to the motor vehicle 11 at the pivot point 62. Thus, when the headlamp 54 is turned on, the entire headlamp 54 including the headlamp door 56, pivotable housing 58 and projector 14 are rotated by the pivot actuator 60 into the operating or "on" position shown in FIG. 6. In this embodiment, the projector angle 48 and the mirror angle 46 continuously remain in alignment throughout the range of motion of the pop-up headlamp 54.

With regard to the pivot actuator 60, it may be any mechanism capable of rotating the pop-up headlamp 54 into the operating or "on" position. This may include, for example, an electric motor, a stepper motor, a linear actuator, or vacuum system, and a hydraulic or pneumatic piston. The pivot actuator 50 is mounted to the vehicle 11 using any appropriate fastening method, for example, screws or rivets.

The present invention has great flexibility in meeting the design and stylistic requirements of a particular application over existing projector-style headlamp assemblies by reducing the overall depth 50 of the headlamp assembly 10. For example, greater styling freedom is possible since the projector bulb is completely hidden from view. This also means luminance is decreased since oncoming vehicles will be exposed to the spot on the mirror surface, rather than directly to light from the condenser lens 26 as in the prior art. This reduces the "glare" seen by on-coming drivers. Other advantages include facilitating the replacement of projector bulbs by orienting the projector 14 toward more accessible locations within the vehicle, and facilitating the use of projectors in a "pop-up" configuration.

As a person skilled in the art will readily appreciate, the above description is meant as an illustration of implementing of the principles of the present this invention. This description is not intended to limit the scope or application of this invention in that the invention is susceptible to modification, variation and change, without departing from spirit of this invention, as defined in the following claims.

We claim:

1. An automotive headlamp assembly for use in a motor vehicle, the motor vehicle defining vertical, cross-car and lengthwise axes, oriented perpendicular to one another, wherein the cross-car axis is oriented along a width of the vehicle and the lengthwise axis is oriented along a length of the vehicle, comprising:
    a housing including an exterior cover lens and at least one mirror, the housing defining a housing axis extending between the exterior lens and the mirror and being oriented along the length wise axis of the vehicle;
    a projector module including a halogen or HID light source, a reflector, and a condenser lens co-axially arranged along a projector axis defined between the light source and the condenser lens;
    wherein the projector is coupled to the housing and a projector axis angle substantially greater than zero degrees is defined between the projector axis and the housing axis, whereby light from the light source is focused by the condenser lens onto the mirror, the mirror being configured to reflect the light through the exterior lens along the housing axis.

2. The automotive headlamp assembly of claim 1, wherein the mirror is oriented with respect to the housing axis at a mirror angle.

3. The automotive headlamp assembly of claim 2, wherein the mirror angle is one-half of the projector axis angle.

4. The automotive headlamp assembly of claim 2, wherein the projector axis angle is 90 degrees and the mirror angle is 45 degrees.

5. The automotive headlamp assembly of claim 1, wherein the projector is oriented about the housing axis with respect to the housing.

6. The automotive headlamp assembly of claim 5, wherein the projector is oriented horizontally.

7. The automotive headlamp assembly of claim 5, wherein the projector is oriented vertically.

8. The automotive headlamp assembly of claim 1, wherein the mirror is integral with a frame of the housing.

9. The automotive headlamp assembly of claim 8 further comprising adjustment screws coupled to the housing and mirror, the adjustment screws being configured to move the mirror with respect to the housing.

10. The automotive headlamp assembly of claim 1, wherein the mirror is movably mounted to the housing and includes a first adjustment mechanism configured to move the mirror with respect to the housing.

11. The automotive headlamp assembly of claim 10 wherein the first adjustment mechanism includes a screw.

12. The automotive headlamp assembly of claim 1, wherein the projector is moveably coupled to the housing and includes a second adjustment mechanism configured to move the projector and projector axis with respect to the housing.

13. The automotive headlamp assembly of claim 12, wherein the second adjustment mechanism includes a screw.

14. An automotive headlamp assembly for use in a motor vehicle, the motor vehicle defining vertical, cross-car and lengthwise axes, oriented perpendicular to one another, wherein the cross-car axis is oriented along a width of the vehicle and the lengthwise axis is oriented along a length of the vehicle, comprising:
    a housing including an exterior cover lens and at least one mirror, the housing defining a housing axis extending between the exterior lens and the mirror and being oriented along the length wise axis of the vehicle;
    a projector module including a light source, a reflector, and a condenser lens co-axially arranged along a projector axis defined between the light source and the condenser lens;
    wherein the projector is coupled to the housing and a projector axis angle substantially greater than zero degrees is defined between the projector axis and the housing axis, whereby light from the light source is focused by the condenser lens onto the mirror, the mirror being configured to reflect the light through the exterior lens along the housing axis, the headlamp assembly being pivotably mounted within the vehicle and an actuator being coupled to the housing and configured to pivot the housing between an "on" and an "off" position.

15. An automotive headlamp assembly for use in a motor vehicle, the motor vehicle defining vertical, cross-car and lengthwise axes, oriented perpendicular to one another, wherein the cross-car axis is oriented along a width of the vehicle and the lengthwise axis is oriented along a length of the vehicle, comprising:
    a housing including an exterior cover lens and at least one mirror, the housing defining a housing axis extending between the exterior lens and the mirror and being pivotably mounted and oriented along the lengthwise axis of the vehicle;
    a projector module including a light source, a reflector, and a condenser lens co-axially arranged along a projector axis defined between the light source and the condenser lens and being stationarily mounted to the vehicle;
    wherein the projector is pivotably coupled to the housing and a projector axis angle substantially greater than zero degrees is defined between the projector axis and the housing axis, whereby light from the light source is focused by the condenser lens onto the mirror, the mirror being configured to reflect the light through the exterior lens along the housing axis, and an actuator being coupled to the housing is configured to pivot the housing relative to the projector between an "on" and an "off" position.

* * * * *